(12) United States Patent
Blanchet et al.

(10) Patent No.: US 11,389,778 B2
(45) Date of Patent: Jul. 19, 2022

(54) METHOD OF FABRICATING CONCENTRIC-TUBE CATALYTIC REACTOR ASSEMBLY

(71) Applicant: PowerTap Hydrogen Fueling Corp., Newport Beach, CA (US)

(72) Inventors: Scott Blanchet, Chelmsford, MA (US); Zhijiang Li, Franklin, MA (US)

(73) Assignee: PowerTap Hydrogen Fueling Corp., Newport Beach, CA (US)

( * ) Notice: Subject to any disclaimer, the term of this patent is extended or adjusted under 35 U.S.C. 154(b) by 0 days.

(21) Appl. No.: 16/731,811

(22) Filed: Dec. 31, 2019

(65) Prior Publication Data

US 2020/0129949 A1   Apr. 30, 2020

Related U.S. Application Data

(63) Continuation of application No. 15/216,734, filed on Jul. 22, 2016, now Pat. No. 10,549,250.
(Continued)

(51) Int. Cl.
| | |
|---|---|
| *B23P 11/00* | (2006.01) |
| *B01J 15/00* | (2006.01) |
| *B01J 8/02* | (2006.01) |
| *B01J 8/06* | (2006.01) |
| *B01J 12/00* | (2006.01) |

(Continued)

(52) U.S. Cl.
CPC ........... *B01J 15/005* (2013.01); *B01J 8/0214* (2013.01); *B01J 8/065* (2013.01); *B01J 12/007* (2013.01); *B01J 19/2485* (2013.01); *B01J 19/32* (2013.01); *B23P 11/005* (2013.01); *B01J 2208/00893* (2013.01); *B01J 2219/2419* (2013.01); *B01J 2219/2428* (2013.01); *B01J 2219/2443* (2013.01); *B01J 2219/3221* (2013.01); *B01J 2219/32237* (2013.01); *B01J 2219/32296* (2013.01); *B01J 2219/32408* (2013.01); *B01J 2219/32425* (2013.01)

(58) Field of Classification Search
CPC .......................... B01J 15/005; Y10T 29/49345
See application file for complete search history.

(56) References Cited

U.S. PATENT DOCUMENTS

| | | | |
|---|---|---|---|
| 171,400 A | 12/1875 | McElroy et al. | |
| 3,002,269 A * | 10/1961 | Hopkins | F01N 13/1811 29/441.1 |

(Continued)

FOREIGN PATENT DOCUMENTS

| | | | | |
|---|---|---|---|---|
| EP | 0431649 A2 * | 6/1991 | ............ | B23P 11/005 |
| JP | S58-106388 A | 6/1983 | | |

(Continued)

OTHER PUBLICATIONS

English translation EP 0431649 (Year: 1991).*
(Continued)

*Primary Examiner* — Jason L Vaughan
*Assistant Examiner* — Amanda Kreiling
(74) *Attorney, Agent, or Firm* — The Webb Law Firm

(57) ABSTRACT

A method of fabricating a catalytic reactor assembly having an outer tube and an inner tube is provided. The method may include inserting a catalyst into the outer tube and inserting the inner tube through the catalyst. The method may further include radially expanding the inner tube against the catalyst.

14 Claims, 3 Drawing Sheets

Related U.S. Application Data

(60) Provisional application No. 62/196,737, filed on Jul. 24, 2015.

(51) Int. Cl.
    *B01J 19/24*     (2006.01)
    *B01J 19/32*     (2006.01)

(56) References Cited

U.S. PATENT DOCUMENTS

| | | |
|---|---|---|
| 4,309,817 A | 1/1982 | Goebel et al. |
| 4,823,711 A | 4/1989 | Kroneberger et al. |
| 6,701,764 B2 | 3/2004 | Bruck et al. |
| 10,549,250 B2 * | 2/2020 | Blanchet ............... B01J 15/005 |
| 2013/0164179 A1 | 6/2013 | Dong et al. |
| 2013/0334465 A1 | 12/2013 | Zhao et al. |

FOREIGN PATENT DOCUMENTS

| | | |
|---|---|---|
| WO | 9012985 A1 | 11/1990 |
| WO | WO 2010/103740 | 9/2010 |
| WO | WO 2011/151986 | 8/2011 |

OTHER PUBLICATIONS

Patel et al., "Dynamic behaviour of methane heat exchange reformer for residential fuel cell power generation system", Journal of Power Sources, Oct. 20, 2006, pp. 503-512, vol. 161:1.

International Search Report in Application No. PCT/US2016/043551 dated Oct. 31, 2016 in 3 pages.

International Preliminary Report on Patentability in Application No. PCT/US2016/043551 dated Jan. 30, 2018 in 6 pgs.

* cited by examiner

METHOD OF FABRICATING CONCENTRIC-TUBE CATALYTIC REACTOR ASSEMBLY

This application is a continuation of application Ser. No. 15/216,734, filed Jul. 22, 2016, and claims the benefit of U.S. Provisional Application No. 62/196,737, filed Jul. 24, 2015, all of which are incorporated herein by reference.

The present disclosure is directed towards a method of fabricating a catalytic reactor assembly, and more particularly, a method of fabricating a concentric-tube catalytic reactor assembly.

Catalytic reactors are devices used in the production of commercial gases through catalytic reforming processes. A catalytic reactor receives feed materials (e.g., a carbonaceous fuel and steam) and guides them through heated passages containing catalysts that convert the feed materials into production gases (e.g., hydrogen, carbon monoxide, carbon dioxide, etc.). Catalytic reactors are sometimes used in conjunction with other devices that consume production gases to drive other processes. For example, catalytic reactors are sometimes used to generate and supply hydrogen to fuel cells that convert the chemical energy of hydrogen into electricity.

Some catalytic reactors utilize a tube-in-tube or concentric-tube design in order to reduce the overall size of the reactor or to facilitate specific physical designs and process connection points. Concentric-tube reactors occupy less space by introducing feed materials or reactants through a first tube that is concentric with and fluidly connected to a second tube containing the reactor's catalyst materials. The compactness of concentric-tube designs improves heat transfer efficiency within the reactor, allowing the reactor to operate at lower temperatures and pressures. At lower temperatures and pressures, the reactor may be simpler in design and construction and may incorporate less expensive materials, thereby reducing the overall cost to construct and operate the reactor. Concentric-tube reactors also enable all process connections to be made at one end of the tube, simplifying construction and enabling designs with low stress under thermal cycling operating conditions.

To further improve reactor efficiency and reduce the cost of operation, manufacturers may wish to ensure that all reactants supplied to the reactor are converted into production gases by the catalysts contained in the reactor. However, many catalysts incorporated into reactor assemblies are pre-fabricated with reduced outer diameters and/or increased inner diameters to allow them to be more easily slid between the reactor tubes without being damaged during reactor assembly. This loosening of the fit between the catalyst and the reactor tubes can allow reactants to pass between the catalyst and reactor tubes during operation without being converted into production gases, thereby reducing the conversion efficiency of the reactor. Alternative fabrication methods have involved the use of complicated fixtures and assembly procedures, which may be time consuming and costly.

Therefore, there is a need for an improved method of fabricating concentric-tube catalytic reactors that results in a better seal between the catalyst and the reactor tubes.

One aspect of the present disclosure is directed to a method of fabricating a catalytic reactor assembly having an outer tube and an inner tube. The method may include inserting a catalyst into the outer tube and inserting the inner tube through the catalyst. The method may further include radially expanding the inner tube against the catalyst.

Another aspect of the present disclosure is directed to a method of fabricating a catalytic reactor assembly having an outer tube and an inner tube. The method may include inserting a catalyst into the outer tube and inserting the inner tube through the catalyst, wherein the inner tube is concentric with the catalyst and the outer tube. The method may further include connecting at least a first end of the inner tube to a source of pressurized fluid, directing pressurized fluid from the source into the at least first end of the inner tube, and radially expanding the inner tube against an inner surface of the catalyst using pressurized fluid from the source.

Another aspect of the present disclosure is directed to a method of fabricating a catalytic reactor assembly having an outer tube and an inner tube. The method may include inserting a catalyst into the outer tube and inserting the inner tube through the catalyst, wherein the inner tube is concentric with the catalyst and the outer tube. The method may further include connecting a first end of the inner tube to a source of pressurized fluid, sealing a second end of the inner tube, directing pressurized fluid from the source into the first end of the inner tube, and radially expanding the inner tube against an inner surface of the catalyst using pressurized fluid from the source. The method may further include evacuating the inner tube of pressurized fluid. The method may further include installing a cap onto an end of the outer tube and sealing the end of the outer tube.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to catalytic reactor assembly, it is understood that the methods of the present disclosure may be employed with various types of devices, including, but not limited to catalytic reactors, exhaust purification catalysts, particulate filters, mufflers and sound attenuating devices and heat exchangers.

Figure 1:
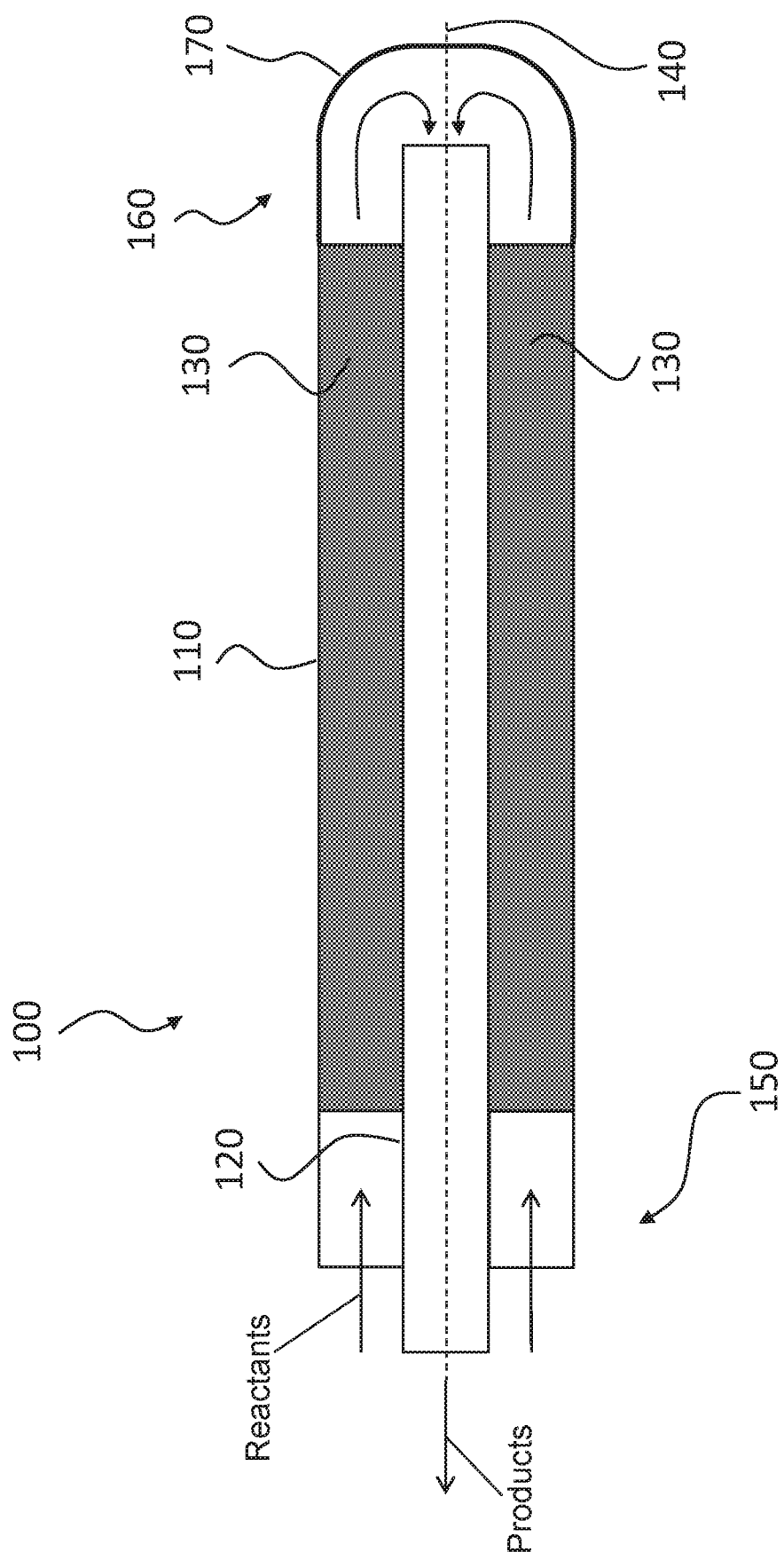
FIG. 1 is a longitudinal cross-sectional illustration of an exemplary disclosed catalytic reactor assembly.

FIG. 1 shows a cross-sectional illustration of a catalytic reactor assembly ("assembly") 100, according to an exemplary embodiment. Assembly 100 may comprise an outer tube 110, an inner tube 120, and a catalyst 130 disposed in between outer tube 110 and inner tube 120. Catalyst 130 may be, for example, a toroidal or "donut-shaped" catalyst, a cylindrical catalyst, or an annular catalyst. The catalyst may be in the form of individual pellets or coated onto a metal foil structure. The catalyst may be a single large element (as shown in FIG. 1) or in the form of shorter, individual toroid elements stacked together. Short, individual toroid elements may be stacked tightly or spaced apart from each other. In the embodiment of FIG. 1, outer tube 110, inner tube 120, and catalyst 130 are concentric about a common axis 140. For example, assembly 100 may be a concentric-tube reactor or a tube-in-tube reactor. In other embodiments, outer tube 110, inner tube 120, and catalyst 130 may be offset from one another.

Reactants may flow into one of outer tube 110 and inner tube 120 at a first end 150 of assembly 100, through catalyst 130, and into the other of outer tube 110 and inner tube 120 at a closed second end 160 of assembly 100. Second end 160 may be sealed by a cap 170 (e.g., welded to outer tube 110), a compression fitting, or another sealing mechanism. As shown in FIG. 1, reactants may flow into first end 150 via outer tube 110, through catalyst 130, and into inner tube 120 at second end 160. After passing through catalyst 130, the reactants may be converted into products (e.g., product gases) and exit assembly 100 via inner tube 120 at first end 150. In another embodiment, the reactants may flow into assembly 100 via inner tube 120 at first end 150, through catalyst 130, and into outer tube 110 at second end 160. After passing through catalyst 130, the reactants may be converted into products and exit assembly 100 via outer tube 110 at first end 150. Other configurations of outer tube 110, inner tube 120, and catalyst 130 may be possible.

Outer and inner tubes 110, 120 may be formed of a metal or other material configured to withstand the temperatures and pressures at which reactions within assembly 100 are performed. For example, outer and inner tubes 110, 120 may be formed of stainless steel and/or other steel or nickel-based alloys, such as those containing one or more of iron, chromium, nickel, niobium, and/or other materials. Outer and inner tubes 110, 120 may each have a desired diameter and thickness based on desired operating parameters and conditions of assembly 100. For example, the diameter of outer and inner tubes 110, 120 may be increased to accommodate higher throughputs (i.e., higher quantities and/or rates of production), and the thickness of tubes 110, 120 may be increased to accommodate higher operating pressures and/or temperatures.

Catalyst 130 may be a pre-fabricated catalyst configured to fit within outer tube 110. Catalyst 130 may comprise one or more of particulates, pellets, and a coating disposed on a support structure. For example, catalyst 130 may comprise a catalytic coating disposed on structured support (e.g., honeycomb, wall flow, flow-through, fiber, mesh, screen, corrugated foil, stamped foil, metal or ceramic foam, perforated foil, etc.). The structured support may be formed of one or more materials (e.g., silica, alumina, cordierite, zeolite, ceramics, metals, metal alloys, wire mesh, etc.) configured to withstand the desired operating parameters of assembly 100. Particulates and pellets may be formed of or coated with catalytic materials to form a catalyst bed.

Catalyst 130 may incorporate one or more catalytic materials, such as, for example, nickel, cobalt, ruthenium, rhodium, palladium, platinum, and/or other noble metals and mixtures thereof. Catalyst 130 may also or alternatively include catalytic material mixtures comprising, for example, gold, silver, tin, copper, cobalt, molybdenum, iron, gadolinium, boron, etc. Other materials, such as metal oxides (e.g., aluminum oxides and magnesium oxides) and mixed metal oxides may also or alternatively be used.

Figure 2:
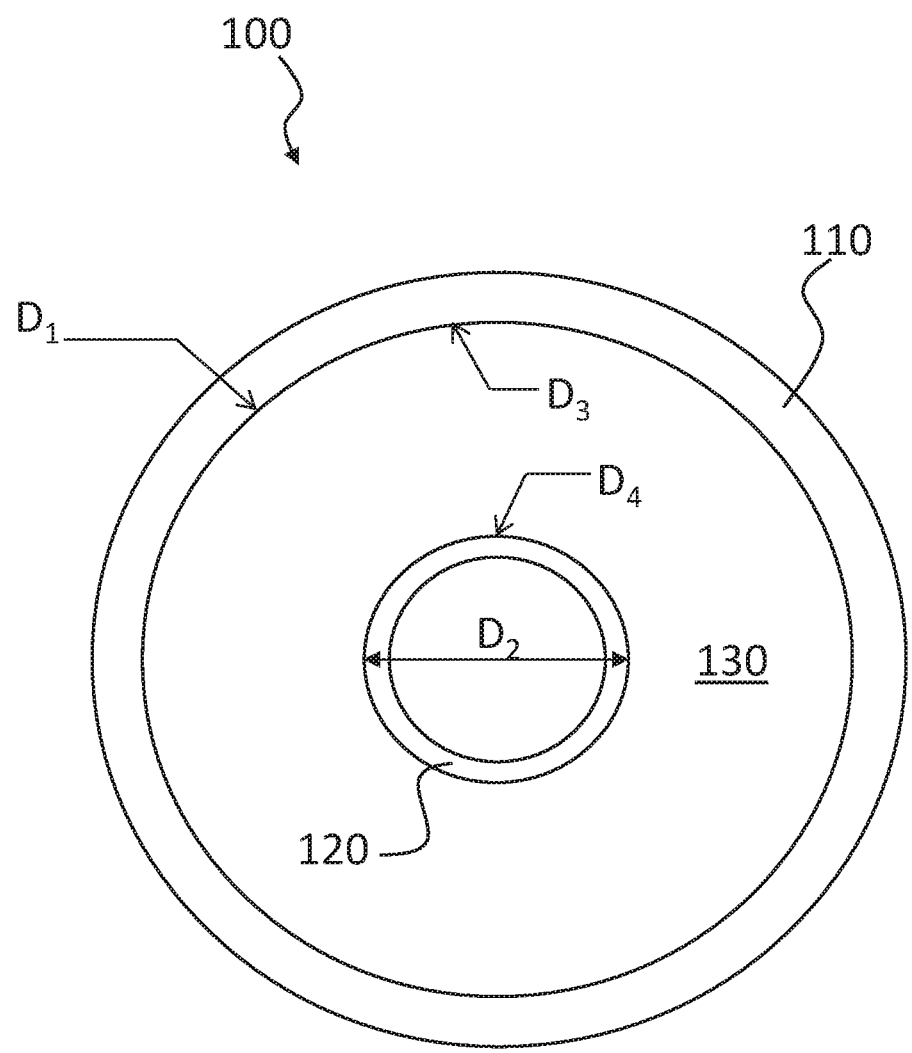
FIG. 2 is latitudinal cross-sectional illustration of the catalytic reactor assembly of FIG. 1.

As shown in FIG. 2, catalyst 130 may be disposed in an annular space between outer tube 110 and inner tube 120. The annular space may be defined by an inner diameter $D_1$ of outer tube 110 and an outer diameter $D_2$ of inner tube 120. Catalyst 130 may be pre-fabricated to have a desired outer diameter $D_3$ and a desired inner diameter $D_4$. For example, the outer diameter $D_3$ of catalyst 130 may be configured to allow catalyst to have a particular fit within outer tube 110. That is, $D_3$ may be selected so catalyst 130 fits snuggly, loosely, very tightly, etc., within outer tube 110. Inner diameter $D_4$ of catalyst 130 may also be selected to have a desired fit around inner tube 120 (e.g., snug, loose, very tight, etc.)

Figure 3:
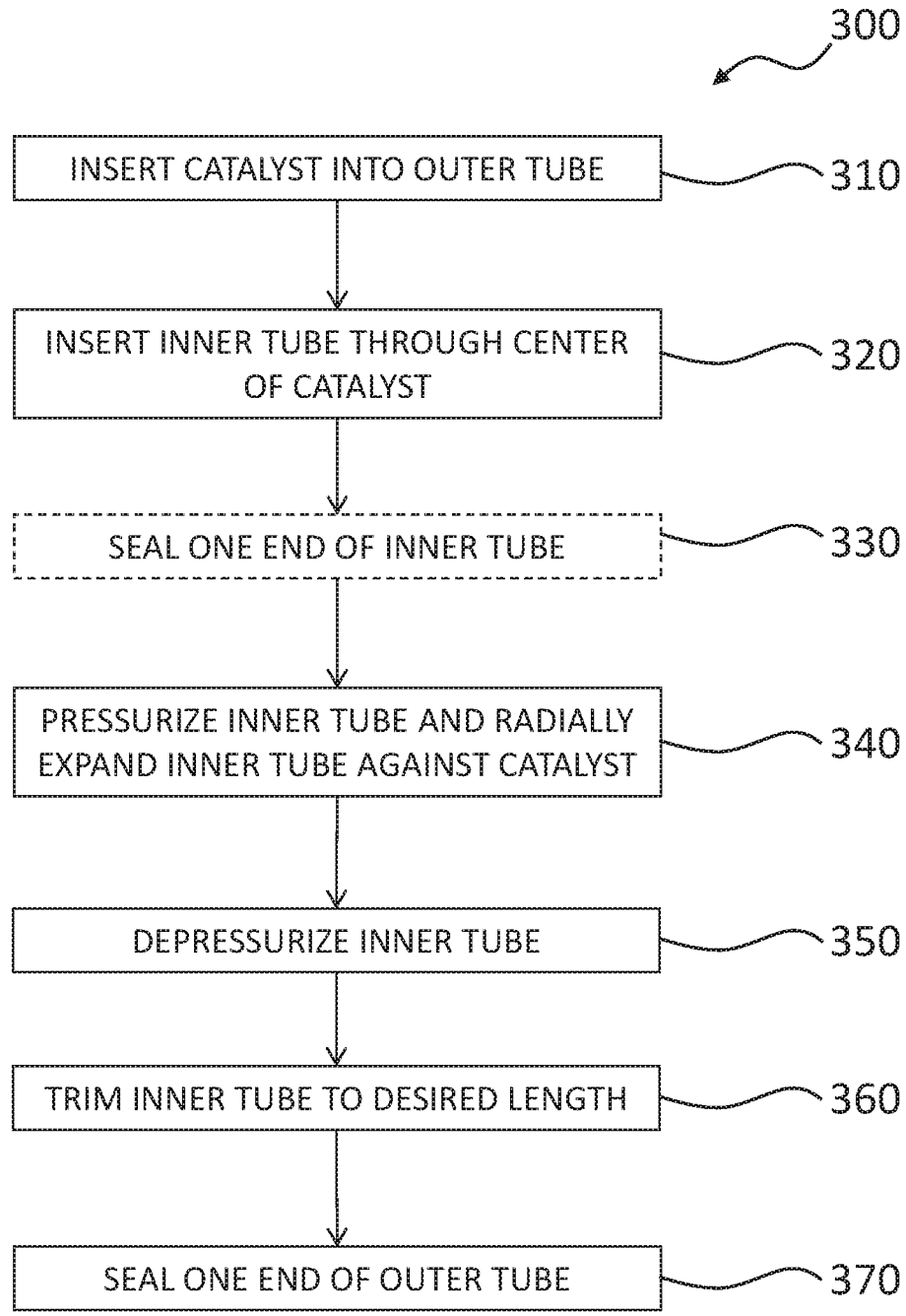
FIG. 3 is a flowchart depicting an exemplary disclosed method of fabricating the catalytic reactor of FIG. 1.

FIG. 3 shows a flowchart depicting an exemplary disclosed method 300 of fabricating assembly 100. Fabrication of assembly 100 may begin with inserting catalyst 130 into outer tube 110 (Step 310). Catalyst 130 may be inserted with outer tube 110 open at first end and second ends 150, 160. Catalyst 130 may be pre-fabricated to have a desired fit when inserted into outer tube 110. For example, in some embodiments, catalyst 130 may be pre-fabricated to fit snugly or very tightly within outer tube 110 upon insertion. In other embodiments, catalyst 130 may be prefabricated to be less snug upon insertion into outer tube 110 in order to allow for radial expansion against the inside of outer tube 110 when inner tube 120 is installed.

Fabrication of assembly 100 may continue by inserting inner tube 120 through the center of catalyst 130 (Step 320). Prior to installation, the outer diameter $D_2$ of inner tube 120 may initially be smaller than the inner diameter of catalyst 130. In this way, inner tube 120 may be inserted through catalyst 130 without damaging catalyst 130. By allowing inner tube 120 to be inserted through catalyst 130 after catalyst 130 has been installed in outer tube 110, the components of assembly 100 may be installed without separating outer tube 110 into longitudinal or latitudinal components. Prior to installation, inner tube 120 may initially be longer than outer tube 110 to allow both ends of inner tube 120 to be accessible during subsequent fabrication steps.

In other embodiments, fabrication of assembly 100 may begin with slipping catalyst 130 over or around inner tube 120. Inner tube 120 may be open at both ends or closed at one end when catalyst 130 is slipped over inner tube 120. Catalyst 130 may be pre-fabricated to have a desired fit around inner tube 120 upon installation. For example, in some embodiments, catalyst 130 may be pre-fabricated to fit snugly or very tightly around inner tube 120 once installed. In other embodiments, catalyst 130 may be prefabricated to be less snug around inner tube 120 in order to allow for radial expansion of inner tube 120 against the inside of catalyst 130.

In embodiments where catalyst 130 is first slipped over inner tube 120, fabrication of assembly 100 may continue by inserting inner tube 120 with catalyst 130 as an assembly or sub-assembly into outer tube 110. Prior to installation, the outer diameter $D_3$ of catalyst 130 may initially be smaller than the inner diameter $D_1$ of outer tube 110, allowing catalyst 130 (alone or in an assembly with inner tube 120 to be inserted into outer tube 110 without damaging catalyst 130. In this way, assembly 100 may also be fabricated without dividing outer tube 110 into longitudinal or latitudinal components and reassembling them after installation of catalyst 130 and/or inner tube 120.

After inner tube 120 and catalyst 130 are installed, one end of inner tube 120 may optionally be sealed (Step 330). For example, one end of inner tube 120 may be welded closed, capped off with a compression fitting, or sealed by another method to allow fluid pressure within inner tube 120 to be increased during subsequent fabrication steps. It is understood that sealing one end of inner tube 120 may be performed before process 300 or at a different point during process 300.

Inner tube 120 may then be pressurized and expanded radially against catalyst 130 (Step 340), for example, using a hydroforming process. That is, pressurized fluid may be directed into inner tube 120, causing the material of inner tube 120 to expand outwardly (i.e., radially) toward catalyst 130, thereby increasing the outer diameter $D_2$ of inner tube. For example, in embodiments where one end of inner tube is sealed (i.e., when step 330 is performed), the open end of inner tube 120 may be fluidly connected to a source of pressurized fluid, such as a compressor or a pump. In embodiments where both ends of inner tube 120 are left open (i.e., when step 33 is not performed), both ends of inner tube 120 may be connected to the source of pressurized fluid. The pressure within inner tube 120 may be increased until inner tube 120 expands to a desired size (e.g., a desired outer diameter $D_2$). In this way, the outer diameter $D_2$ of inner tube 120 may be increased to form a seal with catalyst 130 for preventing the flow of reactants between inner tube 120 and catalyst 130 during operation of assembly 100.

In some embodiments, pressurized fluid may be directed into inner tube 120 to directly cause inner tube 120 to expand. For example, the pressure of a relatively incompressible fluid (e.g., hydraulic fluid, water, etc.) may be gradually increased within inner tube 120 until inner tube 120 expands to the desired size. By controlling the pressure within inner tube 120, the tightness of the seal between inner tube 120 and catalyst 130 may be controlled. That is, increasing the pressure within inner tube 120 may cause inner tube 120 to expand more and create a tighter seal with catalyst 130. In some embodiments, the expansion of inner tube 120 may cause the inner diameter $D_4$ and/or the outer diameter $D_3$ of catalyst 130 to expand, thereby creating a tighter seal between catalyst 130 and the inside of outer tube 110 and/or the outside of inner tube 120.

In other embodiments, an expansion object, such as a metal sphere or rod, may be forced into inner tube 120, causing it to expand to the desired size. For example, the expansion object may be driven or drawn through inner tube 120 under the force of pressurized fluid or by a mechanical device until inner tube 120 is sufficiently expanded. Different expansion objects (e.g., balls, bullets, etc.) having different shapes, materials, and/or sizes may be used, as desired and/or depending on the application.

Expansion techniques may also or alternatively include internal swaging techniques and/or other tube-expanding techniques adapted for use in expanding inner tube 120. For example, elastomeric swaging equipment may be adapted to force an expander attached to a drawbolt through inner tube 120, thereby causing inner tube to expand against catalyst 130. Other swaging techniques and/or swaging tools (e.g., punches, presses, rotary swages etc.) may also be adapted for expanding inner tube 120.

After inner tube 120 has been sufficiently expanded against catalyst 130, inner tube 120 may be depressurized (Step 350). That is, inner tube 120 may be evacuated of pressurized fluid and/or the expansion object and cleaned out. Inner tube 120 may also be disconnected from the source of pressurized fluid. In embodiments where one end of inner tube was sealed, the sealed end of inner tube may also be reopened based on how it was sealed. For example, a cutting technique may be used to reopen inner tube 120 when it was sealed with a welding process. When a compression fitting was used to seal inner tube 120, the fitting may be removed.

At least one end of inner tube 120 may then be cut to a desired length (Step 360). For example, one end of inner tube 120 (e.g., near second end 160) may be cut to an appropriate length to allow inner tube 120 to be contained within inner tube 110. Outer tube 110 may then be sealed at one end (Step 370) to encapsulate inner tube 120 within outer tube 110. For example, cap 170 may be installed on outer tube 110 at second end 160 to seal outer tube 110 and allow fluid to be contained within inner tube 120 during operation of assembly 100. Cap 170 may be installed using a welding process, compressing fittings, or another method of sealing.

Several advantages may be associated with the disclosed method. For example, because inner tube 120 may expand after being inserted through catalyst 130, inner tube 120 may be sufficiently sealed against catalyst 130 to prevent reactants from bypassing catalyst 130 during operation of assembly 100. Also, because inner tube 120 may expand after being inserted through catalyst 130, assembly 100 may have a simple design that is robust, cost effective, and capable of operating at high rates of production. Further, because inner tube 120 may be expanded within catalyst 130 after catalyst 130 has been installed within outer tube 110, the components of catalytic reactor assembly 100 may be formed and assembled without dividing outer tube 110 into multiple parts and reconnecting them.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of fabricating a catalytic reactor assembly having an outer tube and an inner tube, the method comprising:
    inserting a catalyst into the outer tube;
    inserting the inner tube through the catalyst;
    radially expanding the inner tube against the catalyst using an internal swaging technique; and
    trimming a length of the inner tube to a desired length.

2. The method of claim 1, further including installing a cap onto an end of the outer tube and sealing the end of the outer tube.

3. The method of claim 1, further including sealing a first end of the inner tube.

4. The method of claim 3, wherein sealing the first end of the inner tube includes at least one of installing a compressing fitting and welding.

5. The method of claim 1, wherein the internal swaging technique consists of forcing an expander attached to a drawbolt through the inner tube.

6. The method of claim 1, wherein the catalyst is one of an annular catalyst, a cylindrical catalyst, and a toroidal catalyst.

7. The method of claim 6, wherein the catalyst comprises one or more of particulates, pellets, and a coating disposed on a support structure.

8. The method of claim 1, wherein the outer tube, the catalyst, and the inner tube are concentric.

9. The method of claim 1, further including sealing a first end of the outer tube.

10. The method of claim 1, wherein the catalyst is a pre-fabricated catalyst.

11. The method of claim 10, wherein the pre-fabricated catalyst is configured to contact an inner surface of the outer tube.

12. The method of claim 11, wherein the pre-fabricate catalyst is one of a cylindrical catalyst, a toroidal catalyst, and an annular catalyst.

13. The method of claim 12, wherein the pre-fabricated catalyst comprises one or more of pellets, particulates, and a coating disposed on a support structure.

14. The method of claim 4, further including sealing a second end of the inner tube, wherein sealing the second end of the inner tube includes one of installing a compressing fitting and welding.

\* \* \* \* \*